United States Patent [19]

Chevalier

[11] Patent Number: 4,469,301

[45] Date of Patent: Sep. 4, 1984

[54] DEVICE FOR REGULATING THE HEIGHT OF AN ELEMENT AND THE APPLICATION THEREOF IN A VEHICLE SEAT BASE

[75] Inventor: Claude Chevalier, Sully sur Loire, France

[73] Assignee: Compagnie Industrielle de Mecanismes, France

[21] Appl. No.: 385,987

[22] Filed: Jun. 7, 1982

[30] Foreign Application Priority Data

Jun. 17, 1981 [FR] France .................................. 81 11979

[51] Int. Cl.³ .............................................. A47G 29/00
[52] U.S. Cl. ........................................ 248/371; 74/530;
74/540; 248/419
[58] Field of Search ............... 248/371, 419, 424, 396,
248/394, 395, 397, 398, 393; 74/530, 540;
297/346

[56] References Cited

U.S. PATENT DOCUMENTS

| | | | |
|---|---|---|---|
| 3,299,466 | 1/1967 | Werner | 74/530 |
| 3,901,100 | 8/1975 | Iida et al. | 74/530 |
| 3,910,543 | 10/1975 | Fourrey et al. | 248/396 |
| 3,912,215 | 10/1975 | Reinmoller et al. | 248/419 |
| 4,385,743 | 5/1983 | Werner | 248/397 |

Primary Examiner—William H. Schultz
Assistant Examiner—Ramon O. Ramirez

[57] ABSTRACT

The device comprises an effort-reducing gear means interposed between a fixed rack and a toothed sector for locking and unlocking the element. In this way, it is possible to achieve a fine adjustment while employing easily-produced large gear teeth.

4 Claims, 4 Drawing Figures

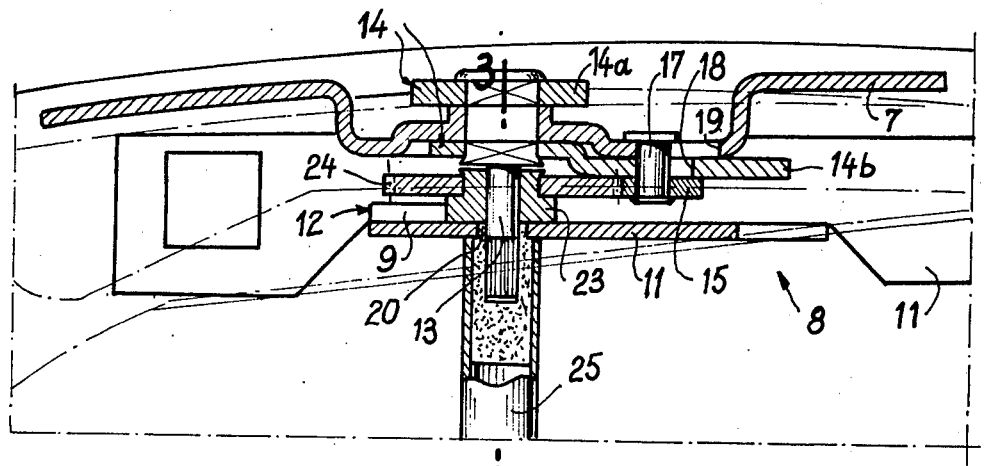
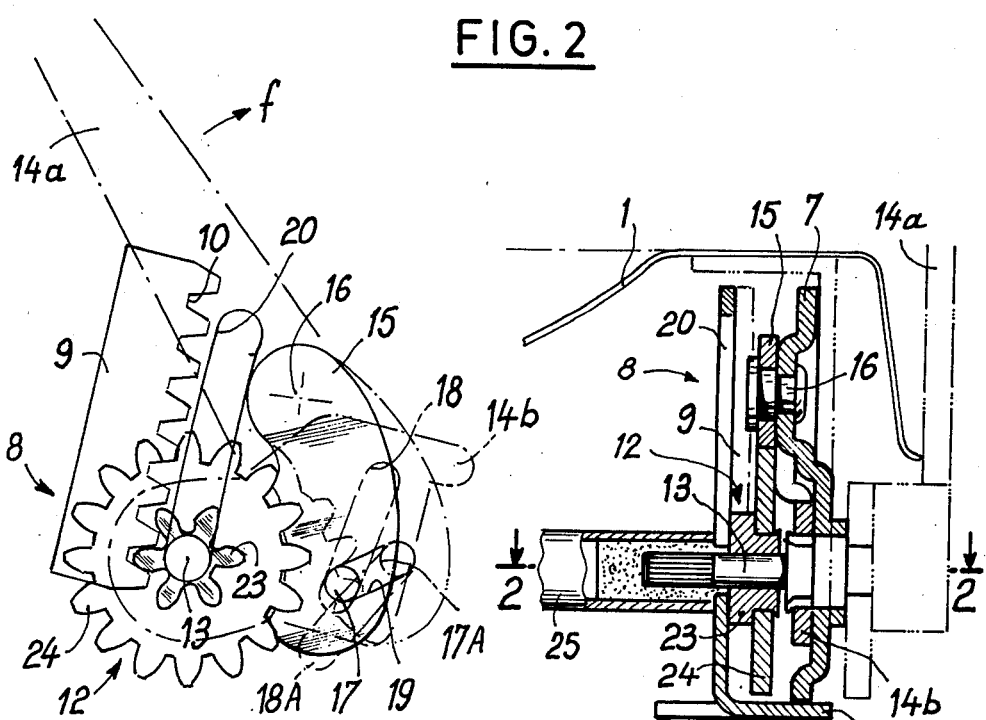

DEVICE FOR REGULATING THE HEIGHT OF AN ELEMENT AND THE APPLICATION THEREOF IN A VEHICLE SEAT BASE

The present invention relates to a device for regulating the height of an element with respect to the support thereof, of the type comprising a rack rigid with the support and an actuatable toothed sector which is movably mounted on said element. It is in particular applicable to the adjustment of the height of one end of an automobile vehicle seat for the purpose of adjusting the angular position thereof.

In Known devices of the aforementioned type, (see for example the patent DE OS No. 2 051 958), the toothed sector is directly engaged with the rack. In order to achieve simultaneously a large number of positions of adjustment and a sufficient strength, many small teeth machined with precision must be provided. Moreover, the device takes up a relatively large amount of space.

An object of the invention is to provide a small adjusting device which permits, for a given fineness of adjustment and tooth thickness, the use of much larger teeth which are cheaper to produce.

The invention accordingly provides an adjusting device of the aforementioned type, comprising an effort-reducing gear means interposed between the rack and the toothed sector, the gear means comprising a double pinion which has small teeth in mesh with the rack and large teeth in mesh with the toothed sector.

Another object of the invention is to provide a base of a vehicle seat of the type comprising a seat frame pivotally mounted by one end on a section member of a longitudinal adjusting slideway and provided at the other end thereof, with a raising mechanism, wherein said mechanism comprises on each side of the base, an adjusting device as defined hereinbefore, and means for synchronizing said two devices.

The invention will be explained hereinafter in more detail with reference to the accompanying drawings which show solely one embodiment.

In the drawings:

FIG. 2 is a partial sectional view to an enlarged scale and taken on line 2—2 of FIG. 1 or FIG. 3;

FIG. 3 is a partial sectional view, to the same scale as FIG. 2, taken on line 3—3 of FIG. 1 or FIG. 2;

FIG. 4 is a diagrammatic side elevational view of the adjusting device.

Figure 1:
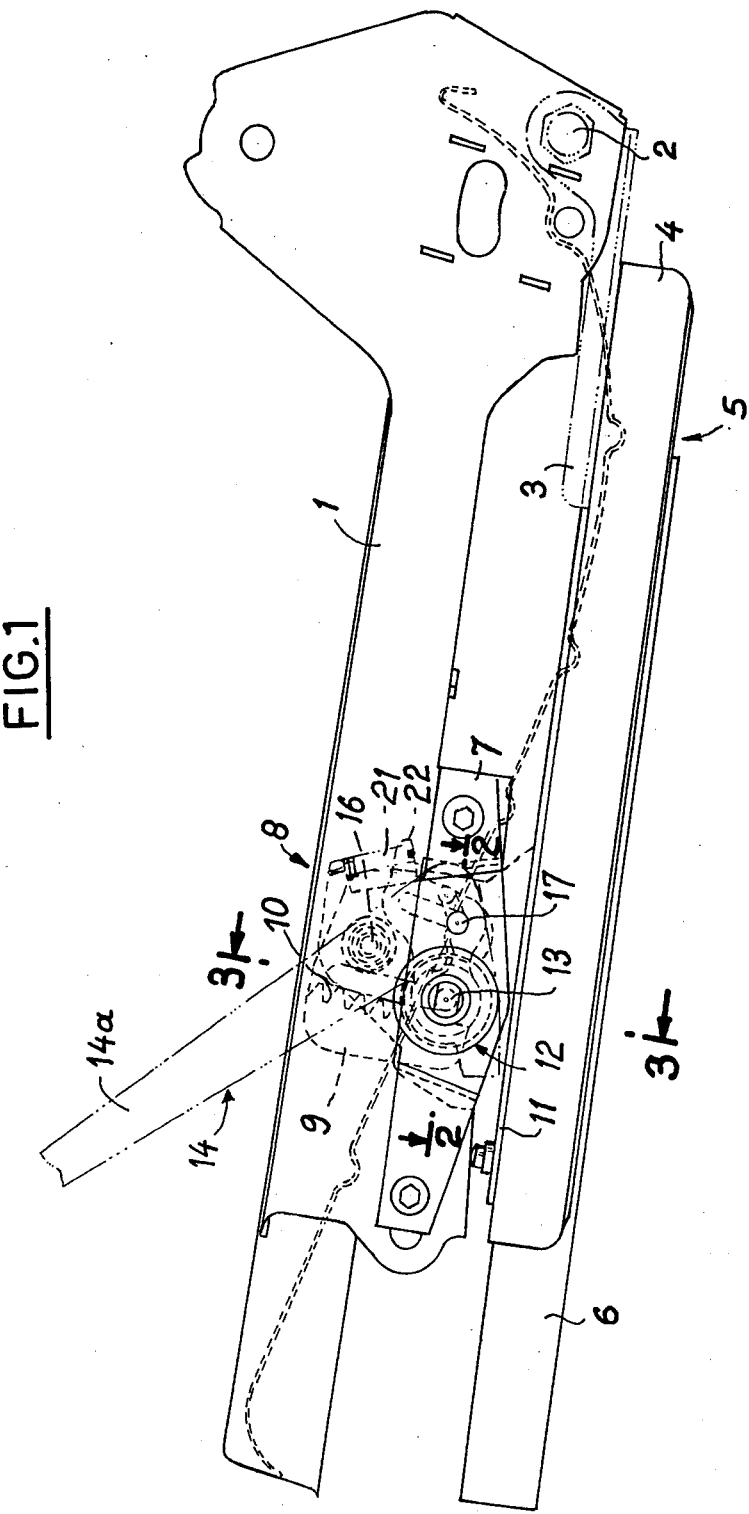
FIG. 1 is a side elevational view of an automobile vehicle seat base provided with an adjusting device according to the invention.

FIG. 1 shows a seat base frame 1 which is mounted by the rear edge thereof to pivot about a horizontal shaft 2. The latter is rigid at each end with a member 3 which is fixed to the movable section member 4 of a forward-rearward adjusting slideway 5 of the seat whose fixed section member 6 is secured to the floor of the vehicle (not shown).

The frame 1 carries, near to the front end thereof on one side, a lateral plate 7 which carries the moving part of the device 8 for adjusting the angular position of the seat, the fixed part being constituted by a vertical rack 9 having a set of teeth 10 in the shape of an arc of a circle centered on the shaft 2 and facing the latter. The rack 9 is rigid with a member 11 fixed to the movable section member 4.

The moving part of the device 8 comprises a double pinion 12 which is journalled on a shaft 13 which is journalled on the plate 7, an actuating lever 14 keyed on the same shaft 13, and a toothed sector 15 in the shape of a haricot bean journalled on a second shaft 16 rigid with the plate 7. The lever 14 is constituted by a handle 14a and an actuating plate 4b which are keyed on the shaft 13. A pin 17 projecting from the sector 15 extends through a slot 18 in the plate 14b and a slot 19 in the plate 7 and the shaft 13 is guided in a slot 20, in the shape of an arc of a circle in the fixed member 11, parallel to the set of teeth 10 of the rack and in the vicinity of the latter.

The lever 14 is biased toward the locking position thereof, i.e. in the counter-clockwise direction, as viewed in FIGS. 1 and 4, by a tension spring 21 which acts between an extension 22 on the plate 14b and the frame 1. The pinion 12 has a set of small teeth 23, namely six teeth, in mesh through one or two teeth with the teeth 10 of the rack, and a set of large teeth 24, namely sixteen teeth, in mesh through four teeth with the sector 15 when the lever 14 is at rest (FIGS. 1 and 4).

More precisely, in the position of rest of the lever 14, the slot 18 of the latter is oriented roughly vertically and intersects the lower end of the slot 19 of the plate 7 which is inclined at roughly 30° to the horizontal. The pin 17 is then in abutment with the lower end of the slot 19 and is close to that of the slot 18.

When the handle 14 is pulled, so as to rotate in the clockwise direction (arrow f of FIG. 4) in opposition to the action of the spring 21, the slot 18 turns about the shaft 13 and reaches the the position 18a of FIG. 4. This constrains the pin 17 to move to the other end of the slot 19 against which it abuts (position 17A of FIG. 4). The pin 17 drives in its movement the sector 15 which rotates in the counter-clockwise direction about the shaft 16 and releases the teeth 24 of the pinion 12.

It is then possible to raise or lower the front of the seat so as to modify the angular position thereof. The teeth 23 of the pinion roll along the teeth 10 of the rack, with the fixed slot 20 performing a guiding function. When the new desired position is reached, the handle 14a is released and, under the effect of the spring 21, the slot 18, the pin 17 and the sector 15 are returned to their initial positions, the sector 15 returning to its position in mesh with the teeth 24.

The other side of the base (not shown) comprises the same component parts except for the handle 14a of the lever 14. The synchronization of the movements is ensured by a tie member 25 which rigidly interconnects the two shafts 13.

It will be understood that the fineness of the adjustment is defined by the angular pitch of the teeth 24 which is much smaller than that of the teeth 23 and 10. The number of adjusting steps is consequently much larger than the number of teeth on the rack 9, which teeth may be relatively large. In other words, the weight is supported by only one or two of the teeth 10 and 23 and this facilitates manufacture.

Further, the effort is reduced between the rack and the sector 15 in the ratio of the two diameters. The sector 15 is therefore easy to unlock. The teeth 24 have roughly the same dimensions as the teeth 23. They could in fact be smaller, but this would render them more difficult to produce with no additional advantage, since the precision of the adjustment in height is already sufficient, at least in the considered application.

Having now claimed my invention what I claim as new and desire to secure by Letters Patent is:

1. A device for adjusting the height of an element with respect to a support therefor, said device comprising a rack rigid with the support and an actuatable toothed sector movably mounted on said element, said device comprising effort-reducing gear means which are interposed between the rack and the toothed sector and comprise a double pinion which has small teeth in mesh with the rack and large teeth in mesh with the toothed sector, the pinion has a shaft which is guided in means defining a slot which is parallel to the rack and rigid with the support.

2. A device according to claim 1, wherein the pinion has a shaft which is guided in means defining a slot which is parallel to the rack and rigid with the support.

3. A vehicle seat base structure comprising a section member of a longitudinal seat adjustment slideway means, a seat frame which is pivotally mounted by one end of the frame on the section member, and a raising mechanism for the seat base, said mechanism comprising, on each side of the base, an adjusting device, each of which devices comprises a rack rigid with the section member and an actuatable toothed sector movably mounted on said frame, said device comprising effort-reducing gear means which are interposed between the rack and the toothed sector and comprise a double pinion which has small teeth in mesh with the rack and large teeth in mesh with the toothed sector.

4. A base according to claim 3, comprising a single actuating handle for simultaneously actuating the two adjusting devices.

* * * * *